US012344388B2

(12) United States Patent
Ridray

(10) Patent No.: US 12,344,388 B2
(45) Date of Patent: Jul. 1, 2025

(54) PROPULSION ASSEMBLY FOR AN AIRCRAFT, COMPRISING A LOAD BEARER

(71) Applicant: AIRBUS OPERATIONS (S.A.S.), Toulouse (FR)

(72) Inventor: Frédéric Ridray, Toulouse (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 195 days.

(21) Appl. No.: 18/119,128

(22) Filed: Mar. 8, 2023

(65) Prior Publication Data
US 2023/0286662 A1 Sep. 14, 2023

(30) Foreign Application Priority Data
Mar. 8, 2022 (FR) ........................................ 2202012

(51) Int. Cl.
*B64D 27/40* (2024.01)
*B64C 7/02* (2006.01)
*B64D 27/12* (2006.01)

(52) U.S. Cl.
CPC ............... *B64D 27/40* (2024.01); *B64C 7/02* (2013.01); *B64D 27/12* (2013.01); *B64D 27/404* (2024.01)

(58) Field of Classification Search
CPC ........ B64D 27/12; B64D 27/16; B64D 27/40; B64D 29/00; B64D 29/02; B64D 29/06; B64C 3/32; B64C 7/02
See application file for complete search history.

(56) References Cited

U.S. PATENT DOCUMENTS

| 9,919,804 | B2 * | 3/2018 | Pautis ..................... B64D 27/40 |
| 2015/0175268 | A1 * | 6/2015 | Guillou .................. B64D 27/40 244/54 |
| 2018/0118358 | A1 * | 5/2018 | Hellegouarch ........ B64D 27/40 |
| 2020/0189759 | A1 * | 6/2020 | Auge ..................... B64D 27/40 |
| 2023/0028982 | A1 * | 1/2023 | Glemarec .............. B64D 27/40 |

FOREIGN PATENT DOCUMENTS

| EP | 3 666 659 | 6/2020 | |
| FR | 3 085 353 | 3/2020 | |
| FR | 3 089 954 | 6/2020 | |
| FR | 3 090 581 | 6/2020 | |
| FR | 3132082 A1 * | 7/2023 | ............ B64D 27/40 |

OTHER PUBLICATIONS

French Search Report for Application No. FR 2202012, two pages, dated Sep. 22, 2022.

* cited by examiner

*Primary Examiner* — Michael C Zarroli
*Assistant Examiner* — Ka Chun Leung
(74) *Attorney, Agent, or Firm* — Nixon & Vanderhye P.C.

(57) ABSTRACT

A propulsion assembly is disclosed including a pylon, a turbomachine having an engine and a fan surrounded by a fan casing, a nacelle surrounding the engine and the fan casing, and including a load bearer positioned at the upper part of the nacelle, a forward fan mount between a frontal zone of the fan casing and a frontal zone of the load bearer, a rear pylon mount between the pylon and the load bearer, and a positioning assembly providing positioning between the fan casing and the load bearer. The propulsion assembly is configured to control the separations between the cowls mounted in a moveable manner on the load bearer and a nose cowl.

12 Claims, 5 Drawing Sheets

PROPULSION ASSEMBLY FOR AN AIRCRAFT, COMPRISING A LOAD BEARER

CROSS REFERENCE TO RELATED APPLICATION

This application claims priority to and incorporates by reference French Application Number FR 2202012, filed Mar. 8, 2022.

BACKGROUND

1. Field of the Invention

The present disclosure relates to a propulsion assembly, and more specifically, to an aircraft engine support assembly having a pylon, a load bearer, and an engine having a fan casing, a forward fan mount for attaching the fan casing to the load bearer, a rear pylon mount for attaching the pylon to the load bearer, and a positioning assembly providing positioning between the fan casing and the load bearer. The present disclosure also relates to an aircraft having at least one such propulsion assembly.

2. Description of Related Art

As an example, EP-A-3 666 659 discloses a propulsion assembly which includes a load bearer which supports a pylon and a fan casing of an aircraft turbomachine or jet engine. While the aircraft in the conventional way comprises a wing beneath which is fixed the pylon to which is fixed the turbomachine which comprises an engine and the fan casing which are fixed to the pylon via a forward engine mount and a rear engine mount.

Arranged at the front of the turbomachine is a nose cowl which delimits an air intake. On the load bearer the fan cowls and thrust reversal cowls are mounted in an articulated manner on hinges.

Although such an installation is fully satisfactory, it is desirable to improve, amongst other things, the separation between the articulated lateral cowls and the nose cowl.

SUMMARY

The present disclosure contemplates an alternative propulsion assembly which makes it possible to save space.

The present disclosure is embodied as a propulsion assembly for an aircraft including
  a pylon configured to be fastened beneath a wing of the aircraft,
  a turbomachine comprising an engine and a fan surrounded by a fan casing and positioned upstream of the engine, said turbomachine having a longitudinal direction X and a midplane XZ,
  a nacelle surrounding the engine and the fan casing and comprising a load bearer positioned at the upper part of the nacelle, a nose cowl fixed to a frontal zone of the fan casing forward of the load bearer and lateral cowls mounted in an articulated manner on each side of the load bearer,
  a forward fan mount fixed between the frontal zone of the fan casing and a frontal zone of the load bearer,
  a rear pylon mount fixed between the pylon and a rear part of the load bearer, and
  a positioning assembly comprising a peg secured to the upper and rear part of the fan casing and extending vertically upwards, and an oblong hole made in a lower spar of the load bearer and into which hole the peg can be pushed, with the major axis of the oblong hole being parallel to the longitudinal direction X.

The propulsion assembly makes it possible to control the separations between the articulated cowls mounted on the load bearer, and a nose cowl.

According to an exemplary embodiment, the forward fan mount is fixed directly between the frontal zone of the load bearer and the frontal zone of the fan casing.

The forward fan mount may include, on each side of the midplane XZ, a first fitting secured to the fan casing, and a second fitting secured to the load bearer, and the first fitting and the second fitting are mounted articulated relative to one another about an axis of rotation which is generally perpendicular to the midplane XZ.

According to an exemplary embodiment, the forward fan mount is fixed between the frontal zone of the load bearer and the nose cowl which is fixed to the frontal zone of the fan casing.

The forward fan mount may include, on each side of the midplane XZ, a first fitting secured to the nose cowl, and a second fitting secured to the load bearer, and the first fitting and the second fitting are mounted articulated relative to one another about an axis of rotation which is generally perpendicular to the midplane XZ.

The rear pylon mount may include, on each side of the midplane XZ, a first yoke fitting fixed beneath a lower spar of the load bearer, a second yoke fitting fixed to the pylon and a link rod mounted in an articulated manner between the first yoke fitting and the second yoke fitting about an axis of rotation perpendicular to the midplane XZ.

The invention also contemplates an aircraft having at least one propulsion assembly according to one of the preceding features.

BRIEF DESCRIPTION OF THE DRAWINGS

For an understanding of embodiments of the disclosure, reference is now made to the following description taken in conjunction with the accompanying drawings, in which.

DETAILED DESCRIPTION OF SOME EMBODIMENTS

Some embodiments will now be described with reference to the Figures.

Throughout the following description, by convention, the direction X corresponds to the longitudinal direction of the turbomachine, this direction being parallel to the longitudinal axis X of this turbomachine and oriented towards the front of the aircraft, which is to say in the direction of forward travel F of the aircraft when the turbomachine is in operation. Moreover, the direction Y corresponds to the direction oriented transversely relative to the turbomachine, and the direction Z corresponds to the vertical direction or height, these three directions being mutually orthogonal. The turbomachine has a vertical midplane XZ.

Figure 1:
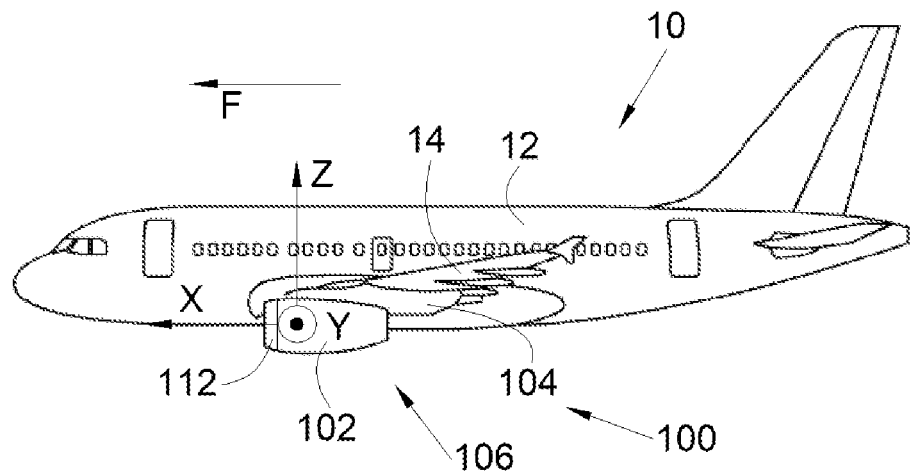
FIG. 1 is a side view of an aircraft having a propulsion assembly according to an exemplary embodiment.

FIG. 1 shows an aircraft 10 which has a fuselage 12 to which are attached two wings 14, one on each side of the fuselage 12. Beneath each wing 14 is fastened at least one propulsion assembly 100 which has a pylon 104 fastened beneath the wing 14 and a turbomachine 102, in this case a bypass turbomachine (bypass aircraft jet engine), fixed to the pylon 104 and comprising an engine 202 (FIG. 3), and a fan surrounded by a fan casing 204 (FIG. 3) and disposed upstream of the engine 202 and driven by the engine 202. The propulsion assembly 100 also comprises a cylindrical nacelle 106 which surrounds the engine 202 and the fan casing 204.

Figure 2:
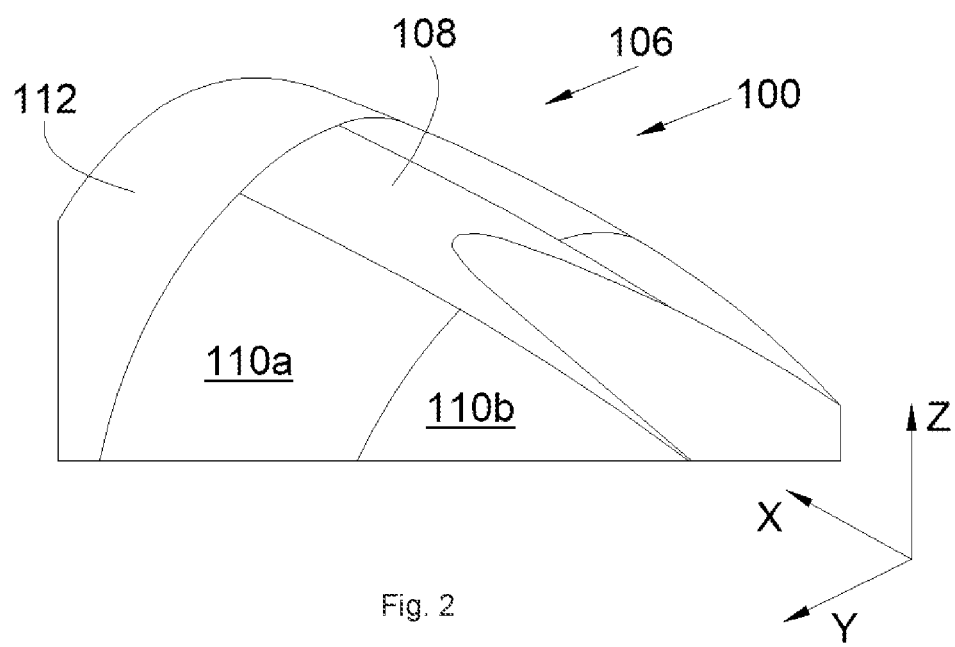
FIG. 2 is a plan view of the propulsion assembly according to an exemplary embodiment.
Figure 3:
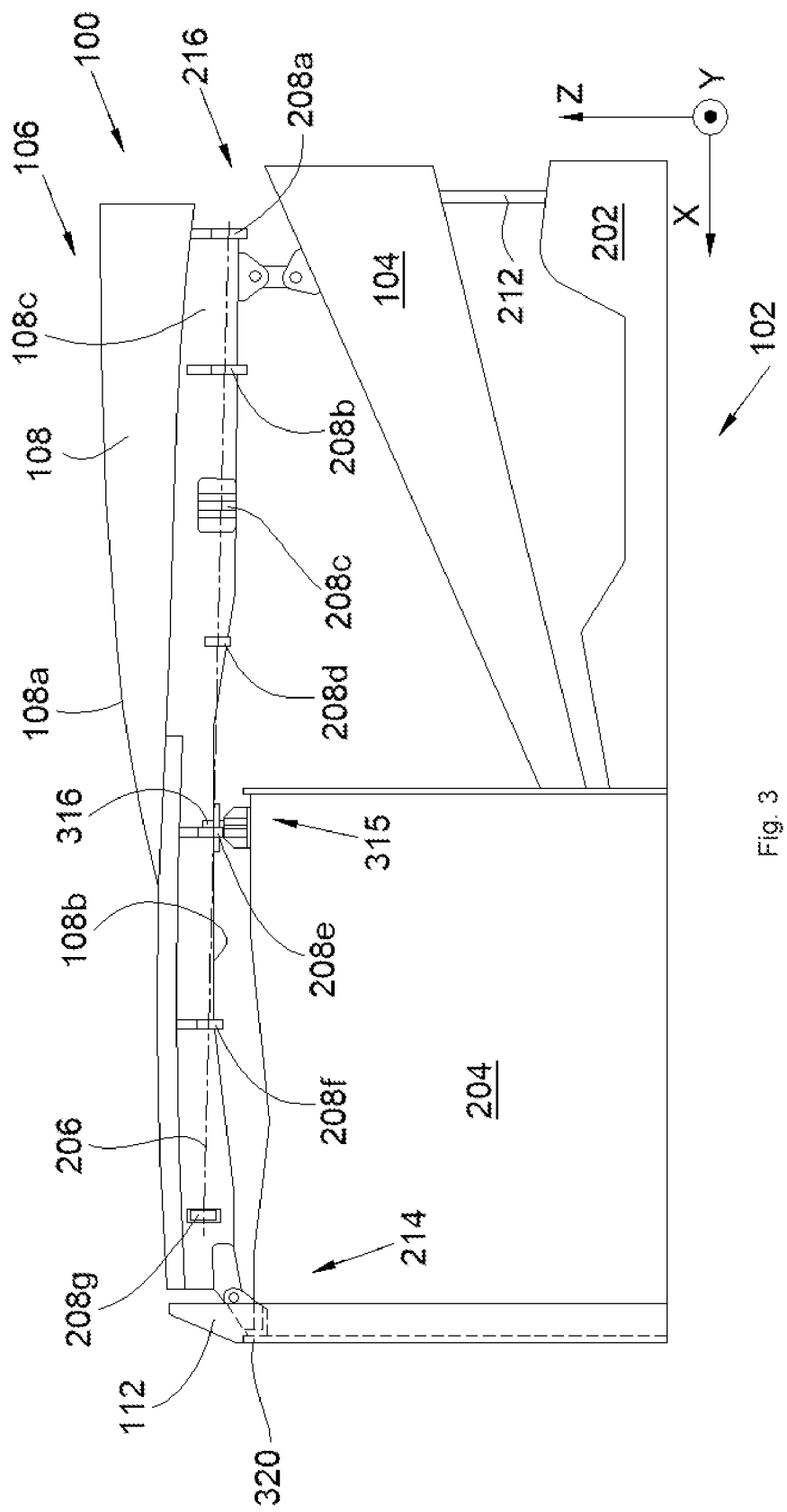
FIG. 3 is a side view of the propulsion assembly according to an exemplary embodiment.
Figure 4:
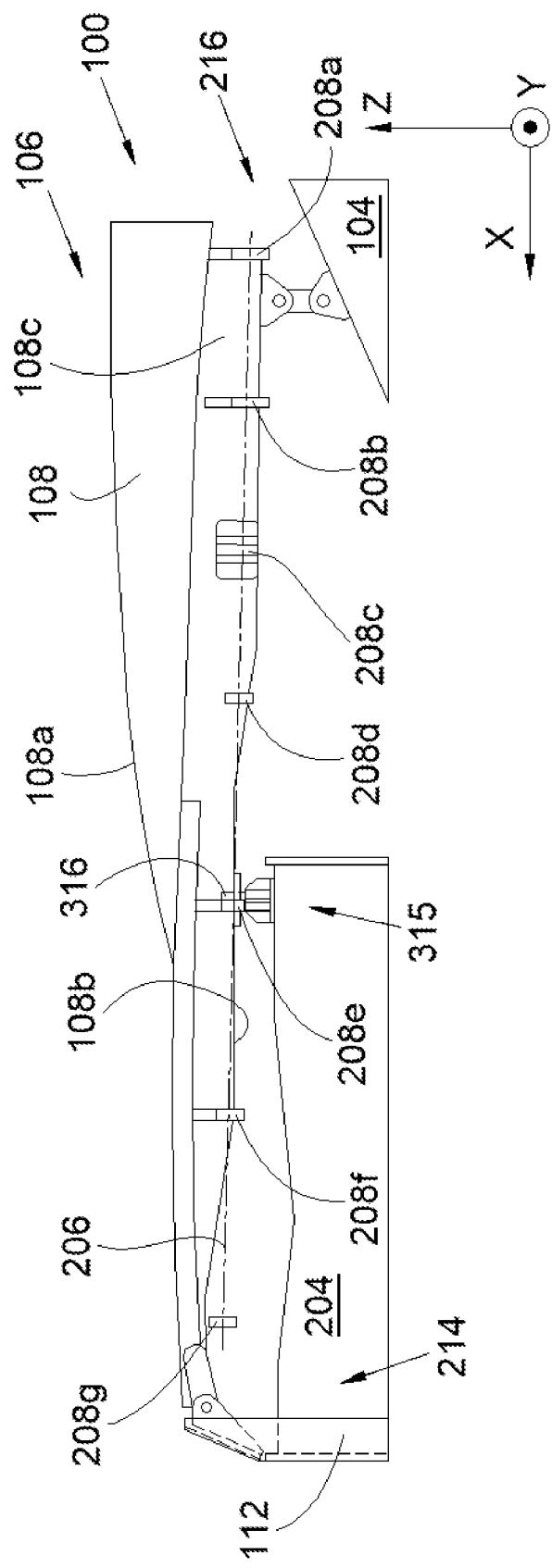
FIG. 4 is a side view of the propulsion assembly according to an exemplary embodiment.

FIG. 2 shows the propulsion assembly 100. The nacelle 106 comprises a load bearer 108 which is positioned in the upper part of the nacelle 106, and lateral cowls 110a-b which are mounted in an articulated manner on each side of the midplane XZ of the load bearer 108 about a hinge axis 206 (FIG. 3). The lateral cowls 110a-b are mounted in an articulated manner on the load bearer 108.

FIG. 3 shows the propulsion assembly 100 without the lateral cowls 110a, 110b. Each lateral cowl 110a, 110b is mounted in an articulated manner on a plurality of hinges. In an exemplary embodiment, there are upstream cowls 110a, typically fan cowls, and downstream cowls 110b, typically thrust reversal cowls 110b for reversing the thrust.

Each hinge has a first hinge fitting and a second hinge fitting mounted in an articulated manner on the first hinge fitting about the hinge axis 206. The second hinge fittings are fixed to the lateral cowls 110a-b.

In an exemplary embodiment, the three first hinges, which are embodied here in the form of their first hinge fittings 208e-g and which are the ones that are furthest forward, are the ones used for fixing the upstream cowls 110a. The four second hinges, which are embodied here in the form of their first hinge fittings 208a-d and which are the ones that are furthest toward the rear, are the ones used for fixing the downstream cowls 110b.

Referring to FIG. 3, of the three first hinges, the rearmost two hinges are fixed hinges and the forwardmost hinge is a floating hinge, and of the four second hinges, the two rearmost hinges are fixed hinges, the forwardmost hinge is a floating hinge, and the intermediate hinge is floating or semi-floating.

For each fixed hinge, the second hinge fitting is fixed to the corresponding lateral cowl 110a-b, and the first hinge fitting 208a, 208b, 208e, 208f is fixed to the load bearer 108. In the case of the semi-floating hinge, the second hinge fitting is fixed to the downstream cowl 110b and the first hinge fitting 208c is fixed in an articulated manner to the load bearer 108 about an axis of rotation that is parallel to the hinge axis 206.

For each floating hinge, the second hinge fitting is fixed to the corresponding lateral cowl 110a, 110b and the first hinge fitting 208d, 208g constitutes the first hinge fitting for the lateral cowl 110a, 110b positioned symmetrically on the other side of the vertical midplane XZ. The first hinge fitting 208d, 208g thus passes through the upper part of the nacelle 106 without being fixed other than by the two hinge fittings of the two lateral cowls 110a-b.

The load bearer 108 takes the form of a box section formed of an upper spar 108a, of a lower spar 108b and of lateral side rail members 108c, 108d. To complete the structure, the load bearer 108 has a plurality of ribs distributed inside the box section and fixed to the spars 108a, 108d.

The nacelle 106 also comprises a nose cowl 112 which is fixed to a frontal zone of the fan casing 104 forward of the load bearer 108, and extending as far as an air intake via which the air supplying the turbomachine 102 enters.

The pylon 104 is fastened to the structure of the wing 14 and bears the engine 202 to which it is fastened by a rear engine mount 212 fastened between a rear part of the pylon 104 and a rear part of the engine 202 and a front engine mount fastened between a front part of the pylon 104 and a front part of the engine 202, in particular at the hub of the engine 202. In FIG. 3, the front engine mount is hidden by the fan casing 204.

The forward engine mount and the rear engine mount 212 will not be described in more detail since they can take any of the forms known to a person skilled in the art. The propulsion assembly 100 also includes a forward fan mount 214 fixed between the frontal zone of the fan casing 204 and a frontal zone of the load bearer 108. The load bearer 108 thus extends over the fan casing 204 and its frontal zone is therefore the zone furthest forward. The frontal zone of the fan casing 204 is its furthest-forward zone.

The propulsion assembly 100 also includes a rear pylon mount 216 fixed between the pylon 104 and a rear part of the load bearer 108. The forward fan mount 214 is located in the upper part of the fan casing 204. Securing the load bearer 108 and the fan casing 204 at their frontal parts makes it possible to guarantee the separations between the nose cowl 112 and the upstream cowls 110a. Securing the load bearer 108 and the pylon 104 also improves the positioning of the downstream cowls 110b relative to the pylon 104. Such fixing also makes it possible to guarantee the separations between the load bearer 108 and the nose cowl 112.

Figure 6:
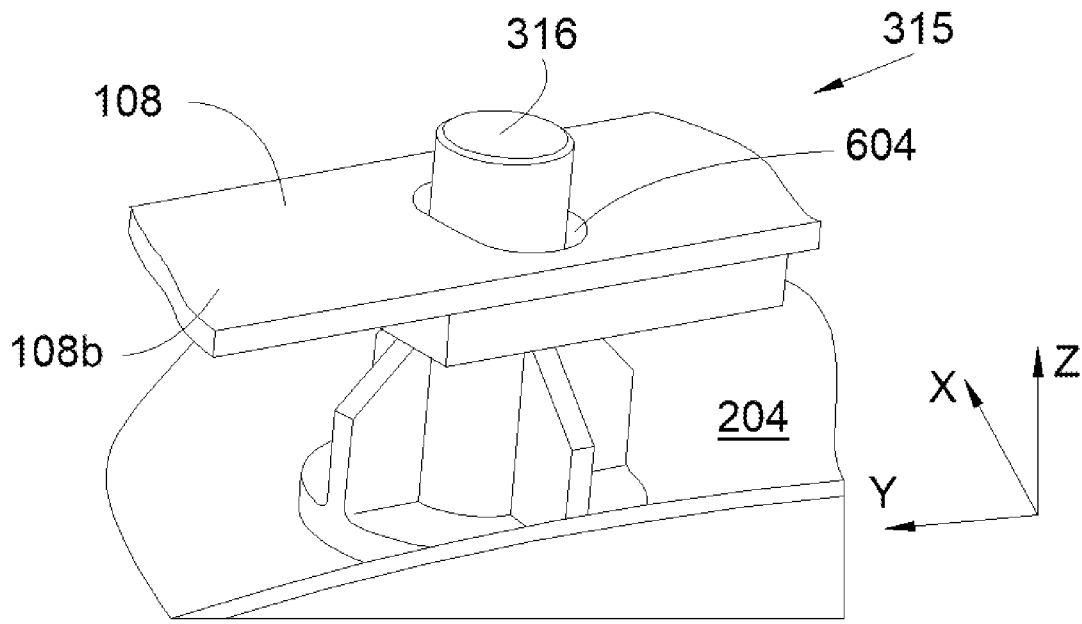
FIG. 6 is a perspective view of a positioning assembly of the propulsion assembly according to an exemplary embodiment; and, FIG. 7 is a perspective view of a rear pylon mount of the propulsion assembly according to an exemplary embodiment.

Referring to FIG. 6, the propulsion assembly 100 also includes an exemplary embodiment of a positioning assembly 315 known as a spigot assembly, positioned at the midplane XZ of the turbomachine 102. The positioning assembly 315 comprises a peg 316 secured to the upper and rear part of the fan casing 204 and extending vertically upwards, and an oblong hole 604 made in the lower spar 108b of the load bearer 108 into which hole the peg 316 can be pushed. The positioning assembly 315 is positioned between the forward fan mount 214 and the rear pylon mount 216.

The major axis of the oblong hole 604 is parallel to the longitudinal direction X. The diameter of the peg 316 is such that the peg is free to move parallel to the longitudinal direction X and remains constrained parallel to the transverse direction Y in which the width of the oblong hole 604 along the minor axis is equal to the diameter of the peg 316. The positioning assembly 315 is able to react forces in Y, while allowing freedom to move in X and Z.

Figure 5:
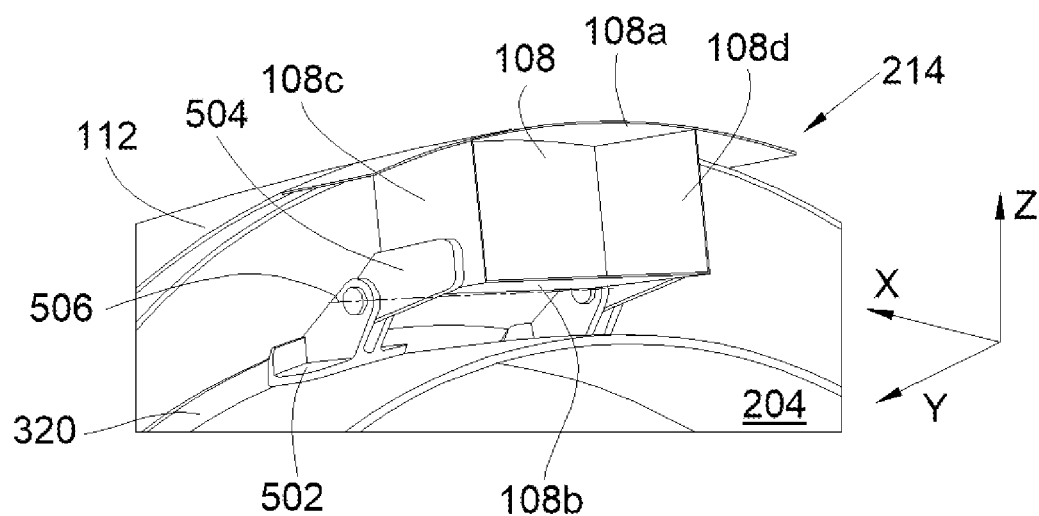
FIG. 5 is a detailed perspective view of a forward fan mount of the propulsion assembly according to an exemplary embodiment.

The load bearer 108 forms a bridge between the pylon 104 and the fan casing 204. Referring to FIG. 3 and FIG. 5, the forward fan mount 214 is fixed directly between the frontal zone of the load bearer 108 and the frontal zone of the fan casing 204, to the rear of a flange 320 defining the frontal zone of the fan casing 204. The forward fan mount 214 is fixed indirectly to the fan casing 204. Specifically, the forward fan mount 214 is fixed between the frontal zone of the load bearer 108 and the nose cowl 112 which is fixed to the frontal zone of the fan casing 204.

Referring now to FIG. 5, the forward fan mount 214 comprises, on each side of the midplane XZ, a first fitting 502 secured, as the case may be, to the fan casing 204 or to the nose cowl 112, and a second fitting 504 secured to the load bearer 108. The first fitting 502 and the second fitting 504 are pivotally mounted and articulated and moveable relative to one another about an axis of rotation 506 generally perpendicular to the midplane XZ.

Figure 7:
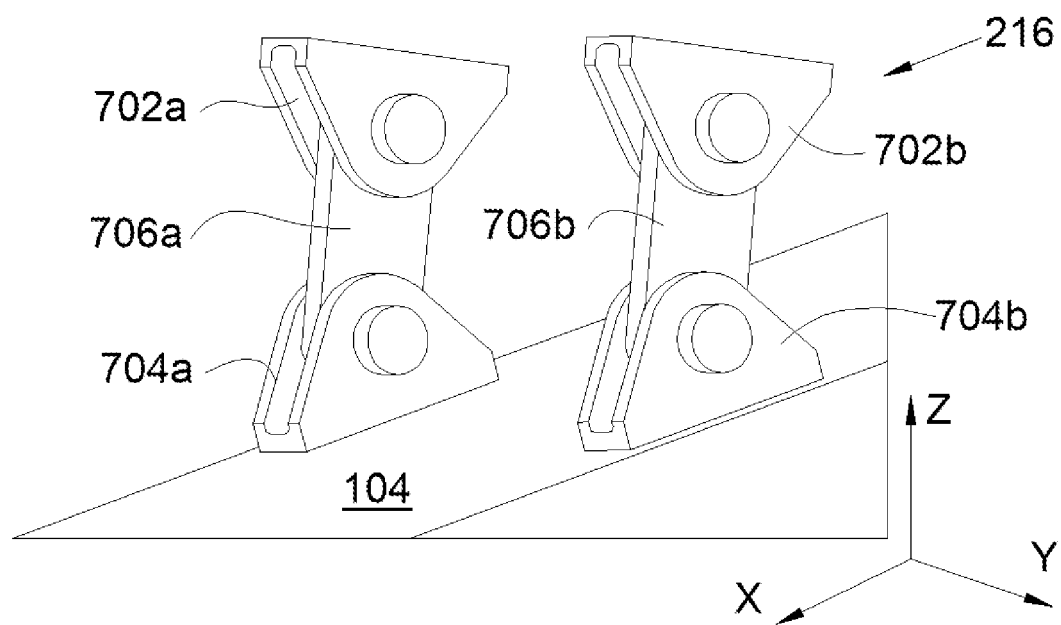

Referring to an exemplary embodiment of the rear pylon mount 216 as depicted in FIG. 7, on each side of the midplane XZ, a first yoke fitting 702a, 702b is fixed beneath the lower spar 108b of the load bearer 108, a second yoke fitting 704a, 704b is fixed to the pylon 104, and a link rod 706a, 706b is mounted in an articulated, pivotable, and moveable manner between the first yoke fitting 702a, 702b and the second yoke fitting 704a, 704b about an axis of rotation generally perpendicular to the midplane XZ. The rear pylon mount 216 is able to react forces in Z.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly for an aircraft, comprising:
a pylon configured to be fastened beneath a wing of the aircraft,
a turbomachine comprising an engine and a fan surrounded by a fan casing and positioned upstream of the engine, the turbomachine having a longitudinal direction X and a midplane XZ,
a nacelle surrounding the engine and the fan casing and further comprising a load bearer positioned at an upper part of the nacelle, a nose cowl fixed to a frontal zone of the fan casing forward of the load bearer and lateral cowls mounted in an articulated manner on each side of the load bearer,
a forward fan mount fixed between the frontal zone of the fan casing and a frontal zone of the load bearer,
a rear pylon mount fixed between the pylon and a rear part of the load bearer, and
a positioning assembly comprising a peg secured to an upper and rear part of the fan casing and extending vertically upwards, and an oblong hole made in a lower spar of the load bearer and into which hole the peg can be pushed, with the major axis of the oblong hole being parallel to the longitudinal direction X.

2. The propulsion assembly according to claim 1, wherein the forward fan mount is fixed directly between the frontal zone of the load bearer and the frontal zone of the fan casing.

3. The propulsion assembly according to claim 2, wherein the forward fan mount comprises, on each side of the midplane XZ, a first fitting secured to the fan casing, and a second fitting secured to the load bearer and in that the first fitting and the second fitting are mounted articulated relative to one another about an axis of rotation which is perpendicular to the midplane XZ.

4. The propulsion assembly according to claim 1, wherein the forward fan mount is fixed between the frontal zone of the load bearer and the nose cowl which is fixed to the frontal zone of the fan casing.

5. The propulsion assembly according to claim 4, wherein the forward fan mount comprises, on each side of the midplane XZ, a first fitting secured to the nose cowl, and a second fitting secured to the load bearer, and in that the first fitting and the second fitting are mounted articulated relative to one another about an axis of rotation which is perpendicular to the midplane XZ.

6. The propulsion assembly according to claim 1, wherein the rear pylon mount comprises, on each side of the midplane XZ, a first yoke fitting fixed beneath a lower spar of the load bearer, a second yoke fitting fixed to the pylon and a link rod mounted in an articulated manner between the first yoke fitting and the second yoke fitting about an axis of rotation perpendicular to the midplane XZ.

7. An aircraft comprising at least one propulsion assembly according to claim 1.

8. A propulsion assembly for an aircraft having a wing, a pylon, a fan casing, and a nacelle, the propulsion assembly comprising:
a load bearer having a distal end and a proximal end, and disposed at an upper part of the nacelle,
a nose cowl disposed on a frontal zone of the fan casing forward of the load bearer,
a pair of lateral cowls mounted pivotally mounted on each side of the load bearer,
a forward fan mount disposed between the frontal zone of the fan casing and the proximal end of the load bearer,
a rear pylon mount disposed between the pylon and the distal end of the load bearer, and
a guiding apparatus comprising a peg secured to an upper and rear part of the fan casing and extending vertically upwards, and an oblong aperture disposed in a lower spar of the load bearer, wherein the peg is configured to be disposed within the oblong aperture, and wherein the axis of the oblong aperture is parallel to a longitudinal direction.

9. The propulsion assembly according to claim 8, wherein the forward fan mount is directly attached to the proximal end of the load bearer at a first end, and to the frontal zone of the fan casing at a second opposing end.

10. The propulsion assembly according to claim 9, wherein the forward fan mount further comprises a first support attached to the fan casing, a second support attached to the load bearer, and wherein the first support and the second support are pivotably movable relative to one another about an axis of rotation perpendicular to a midplane of the propulsion assembly.

11. The propulsion assembly according to claim 9, wherein the forward fan mount further comprises a third support attached to the nose cowl, and a fourth support attached to the load bearer, and wherein the third support and the fourth support are pivotably movable relative to one another about an axis of rotation perpendicular to a midplane of the propulsion assembly.

12. The propulsion assembly according to claim 8, wherein the rear pylon mount further comprises a first yoke support attached beneath a lower spar of the load bearer, a second yoke support attached to the pylon, and a support rod having a first end and a second end, wherein the first end is pivotally mounted to the first yoke support and the second end is pivotally attached to the second yoke support about an axis of rotation perpendicular to a midplane of the propulsion assembly.

\* \* \* \* \*